Patented May 27, 1930

1,760,102

UNITED STATES PATENT OFFICE

HOWARD H. BAKER, OF BUFFALO, NEW YORK, ASSIGNOR TO READY HEAT PRODUCTS, INC., OF BUFFALO, NEW YORK, A CORPORATION OF NEW YORK

COMPOSITION FOR CHEMICAL HEATERS

No Drawing.   Application filed June 26, 1925. Serial No. 39,822.

My invention relates to compositions for chemical heaters, and it has for its primary object to provide a composition of this kind adapted to be contained within a suitable casing and which when provided with the necessary quantity of moisture, will generate a uniform heat and sustain the heat over a longer period of time than has heretofore been possible, the heat being evolved without liberating objectionable gases.

Another object of my invention is to provide a composition for chemical heaters which, when supplied with the necessary quantity of water, will convert the mixture into a galvanic battery and chemical heater which will gradually and quickly build up its heat to the maximum and retain the heat at maximum for a long period of time.

Further objects of my invention will appear in the following description; drawings being deemed unnecessary to illustrate the invention since my improved composition is adapted for use in any approved type of container capable of serving as a heater casing. It may, however, be stated that the ingredients are invariably contained within a casing made of flexible material impervious to moisture but provided in some manner with openings for the escape of steam generated under chemical and electrical action.

The approved form of casing or container for this purpose approaches somewhat the appearance of a hot water bag, particularly since a chemical heater of the kind in which heat generating compositions are contained are adapted for sick room purposes, but it is quite apparent that extended uses are open for chemical heaters, such as small chemical heaters adapted to be placed in one's pocket, larger forms of heaters adapted for use as foot pads, and for many other purposes.

Chemical heating compositions of the kind to which this invention relates are usually placed in bulk form within a flexible casing or container, and the casing or container provided with a filling opening for this purpose, which may be closed after the composition is placed within the casing.

At any time it is desired to generate heat, the inlet or filling opening may be used for providing the composition with the desired quantity of water, and after closing the filling opening, the casing or container, which is made substantially water-tight, will permit chemical action to take place therein, with the result that heat will be generated by the chemical action of substances or ingredients which the composition comprises.

In this application, I do not set out the use of a casing or container of any particular construction, although in my co-pending application Serial No. 99,154 I have shown, described, and claimed a casing or container particularly adapted for use in a chemical heater.

For the purpose of generating heat within a container in accordance with my invention, I combine a number of ingredients; for example, a metallic salt, preferably a salt of copper, specifically known as blue vitriol ($CuSo_4 + 7H_2O$) with comminuted iron (Fe), iron oxide (FeO), or any metal that will be directly acted upon by the acid of the salt and be copper-coated thereby so as to convert these elements into a galvanic battery in the presence of water, varying in quantity depending upon the length of heat periods desired. To these elements are added, a soluble alkali chloride, for example, salt (NaCl), calcium chloride ($CaCl_2$), an oxidizing or depolarizing agent, such as for example, potassium chlorate ($KClO_3$), and an absorbent, such for example as sawdust or charcoal.

These several ingredients, without water, are preferably mixed in dry form and placed within a suitable container, and when it is desired to generate heat, water is added to these ingredients in the desired quantity. The chemical action taking place when the water is added to the mixture, causes the comminuted iron or other metal, to become copper-coated, thus converting the metal into the two metallic elements of what may be termed a galvanic battery, the water, of course, taking on the alkali chloride or salt to serve as the exciting solution for the two metallic galvanic elements thus created.

By the use of the calcium chloride, the moisture is maintained over a long period of time, and the absorbent in the form of pulverized charcoal, sawdust, or the like, keeps the comminuted iron in separated condition, makes the substance quite flexible within the bag so that is can conveniently conform to the parts of the body to which it may be applied, and at the same time retains the moisture which, owing to the absorbent being thoroughly commingled with the comminuted iron, assures the necessary feeding of moisture to the iron particles so that a steady and prolonged heat is assured within the casing.

I have found it of considerable advantage to employ an alkali chloride in conjunction with the blue vitriol, although the blue vitriol alone will copperize iron and produce the two necessary metallic elements of a galvanic battery; but with the addition of salt, the iron becomes copper-coated almost instantly, and chemical and electrical action is therefore set up and increases quickly.

The depolarizing agent, viz. potassium chlorate, unites with hydrogen, liberated by the decomposition of the iron, and this is carried on over a long period of time, or until the electrical potentials of the copper and iron are of the same intensity or kind. The potassium chlorate also furnishes oxygen which combines with the hydrogen liberated under the decomposition of the iron and therefore the electric action continues until the electrolite is saturated.

By creating a galvanic battery when supplying the mixture with the necessary quantity of water, considerably more heat is generated than with the present form of heating composition, and this heat is retained for a longer period of time. Furthermore, no obnoxious gases are created during the time the chemical and electrical action takes place, and although gases are created which are not obnoxious, the oxygen uses up the gases almost as quickly as formed; consequently, it may be stated, no gases are formed other than steam caused by the heating of the water.

While I have found a composition formed of the following proportions to be highly efficient for most purposes, these proportions may, of course, be varied and equivalents may be substituted for the ingredients mentioned.

It is also to be understood that by the omission of some of the ingredients, a heating composition suitable for some purposes could be provided, but I find the ingredients mentioned herein and the proportions to be presently stated to form a heating composition having many advantages over any composition known to me and one which is adapted for all purposes where heat of the kind generated can be used.

In the preparation of my composition I preferably employ the following ingredients in the proportions mentioned:

| | Grains |
|---|---|
| Metal | 3500 |
| Blue vitriol | 350 |
| Salt | 100 |
| Calcium chloride | 35 |
| Potassium chlorate | 50 |
| Sawdust | 50 |

These combined and thoroughly intermingled will set up galvanic heat upon the introduction of a teaspoon of water, more or less, within a casing impervious to water, but provided with means for escape of the steam.

It will, of course, be obvious that for some purposes, changes can be made in my improved composition by the omission of one or more or by the substitute of equivalents, without departing from the principles involved.

Having thus described my invention what I claim is:—

1. A composition for chemical heaters, comprising iron, blue vitriol, an exciting solution, calcium chloride, potassium chlorate, and sawdust.

2. A composition for chemical heaters, comprising suitable comminuted metal, a metallic salt, a soluble alkali chloride, an oxidizing agent and a suitable absorbent.

3. A composition for chemical heaters, comprising comminuted metal, blue vitriol, salt, calcium chloride, potassium chlorate and sawdust, all in commingled form and adapted to receive a quantity of water to cause generation of heat.

4. A composition for chemical heaters, comprising substantially 70 parts of comminuted metal, 7 parts of blue vitriol, 2 parts of salt, 7/10 of one part of calcium chloride, 1 part of potassium chlorate, and 1 part of sawdust, all in commingled form and adapted to receive a quantity of water to cause the generation of heat.

5. A composition for chemical heaters, comprising a metal, a salt of copper to instantly precipitate copper in finely divided form on the metal, an alkali chloride to aid in such precipitation in the presence of water to be added to said composition, an oxidizing agent to act as a depolarizer, and an absorbent material for absorbing and retaining the hot steam formed by the electrolytic and chemical action of the alkali chloride on the two metals in the presence of water.

6. A material for chemical heaters, comprising comminuted iron, blue vitriol, salt, potassium chlorate, and an absorbent, all in commingled form and adapted to receive a quantity of water to cause generation of heat.

In testimony whereof I affix my signature.

HOWARD H. BAKER.